US010116352B2

(12) United States Patent
Kotake et al.

(10) Patent No.: US 10,116,352 B2
(45) Date of Patent: Oct. 30, 2018

(54) COMMUNICATION SYSTEM, TRANSMISSION DEVICE, AND RECEPTION DEVICE

(71) Applicant: Mitsubishi Electric Corporation, Tokyo (JP)

(72) Inventors: Hiroaki Kotake, Tokyo (JP); Yoshiaki Koizumi, Tokyo (JP); Takuya Mukai, Tokyo (JP); Masahiro Ishihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/549,693

(22) PCT Filed: Mar. 3, 2015

(86) PCT No.: PCT/JP2015/056196
§ 371 (c)(1),
(2) Date: Aug. 9, 2017

(87) PCT Pub. No.: WO2016/139746
PCT Pub. Date: Sep. 9, 2016

(65) Prior Publication Data
US 2018/0034503 A1    Feb. 1, 2018

(51) Int. Cl.
*H04B 1/38*    (2015.01)
*H04L 27/00*   (2006.01)
(Continued)

(52) U.S. Cl.
CPC ..................... *H04B 3/54* (2013.01)

(58) Field of Classification Search
USPC .......... 340/12.32, 13.23; 375/211, 219, 220, 375/221, 222, 227, 239, 240, 240.26,
(Continued)

(56) References Cited

U.S. PATENT DOCUMENTS

2005/0141237 A1\* 6/2005 Goto .................. H05B 33/0821
362/555
2010/0117858 A1 5/2010 Rozenboim
(Continued)

FOREIGN PATENT DOCUMENTS

JP    2948502 B2    7/1999
JP    2003-287265 A   10/2003
(Continued)

OTHER PUBLICATIONS

International Search Report of the International Searching Authority dated Apr. 14, 2015 for the corresponding International application No. PCT/JP2015/056196 (and English translation).
(Continued)

Primary Examiner — Linda Wong
(74) Attorney, Agent, or Firm — Posz Law Group, PLC

(57) ABSTRACT

Either one of a communication device and a communication device comprises a direct current power supply configured to generate a direct current for serial communication from alternating current power supplied from an alternating current power supply through a power line and a common line and pass the generated direct current through a current loop. Either the communication device or the communication device comprises an adjuster configured to adjust the impedance between a signal line and the common line based on the voltage between the signal line and the common line (530).

6 Claims, 7 Drawing Sheets

(51) Int. Cl.
*H04L 25/06* (2006.01)
*H04B 3/54* (2006.01)

(58) Field of Classification Search
USPC ..... 375/240.27, 240.29, 254, 256, 259, 267,
375/285, 284, 295, 296, 316, 317, 319,
375/340, 345, 344, 346, 354, 356
See application file for complete search history.

(56) References Cited

U.S. PATENT DOCUMENTS

| | | | |
|---|---|---|---|
| 2012/0049632 A1* | 3/2012 | Sato | B41J 2/0451 307/80 |
| 2012/0086517 A1* | 4/2012 | Urabe | H04B 3/56 333/17.3 |
| 2014/0211864 A1* | 7/2014 | Braunshtein | H04B 3/542 375/257 |
| 2015/0013362 A1* | 1/2015 | Yumoto | F24F 11/30 165/237 |
| 2015/0263630 A1* | 9/2015 | Naka | H02M 3/33507 363/21.04 |
| 2016/0300314 A1* | 10/2016 | Berntsson | G06Q 10/02 |
| 2016/0325636 A1* | 11/2016 | Masuda | B60L 11/1853 |

FOREIGN PATENT DOCUMENTS

| | | |
|---|---|---|
| JP | 2005-226868 A | 8/2005 |
| JP | 2005-257256 A | 9/2005 |

OTHER PUBLICATIONS

Office action dated Apr. 17, 2018 issued in corresponding JP patent application No. 2017-503249 (and English translation thereof).
Office Action dated Aug. 29, 2018, issued in the corresponding German patent application No. 11 2015 006 249.1 (and English translation).

* cited by examiner

COMMUNICATION SYSTEM, TRANSMISSION DEVICE, AND RECEPTION DEVICE

TECHNICAL FIELD

The present disclosure relates to a communication system, a transmission device, and a reception device for serial communication using a current loop.

BACKGROUND ART

Communication systems in which communication devices mutually communicate through serial communication using photocouplers are known. For example, Patent Literature 1 discloses an air conditioning apparatus of a so-called separate type in which indoor units are connected in parallel to an outdoor unit through a pair of commercial power lines (a power line and a common line) and a signal line. In this air conditioning apparatus, the outdoor unit and the indoor units mutually communicate through serial communication using a current loop that includes the signal line and the common line. Here, each indoor unit is provided with a resistor having a high resistance (approximately a few kΩ to a few tens kΩ) on the current loop for protection of the circuit elements included in each indoor unit in the event that the power supply is improperly connected to the signal line.

CITATION LIST

Patent Literature

Patent Literature 1: Japanese Patent No. 2948502.

SUMMARY OF INVENTION

Technical Problem

However, in the configuration described in Patent Literature 1, for example, when there are only a few indoor units, the impedance between the signal line and the common line increases. In such a case, when the outdoor unit shifts the state of the current loop to the cutoff state (the state in which no current flows), the inductive voltage that occurs between the signal line and the common line increases and the noise current due to the inductive voltage also increases. Then, as the noise current increases, the indoor units may falsely detect data.

The present disclosure is made with the view of the above problem and an objective of the disclosure is to provide a communication system, a transmission device, and a reception device that improve the noise resistance in serial communication.

Solution to Problem

In order to achieve the above objective, the communication system according to the present disclosure includes:
 a transmission device configured to transmit data by control of current passing through a current loop, the current loop comprising a signal line and a common line connected in series; and
 a reception device connected to the transmission device by the signal line, the common line, and a power line, and configured to receive the data by detection of current passing through the current loop,
 wherein at least one of the transmission device or the reception device comprises a direct current power supply configured to
  generate a direct current for serial communication from an alternating current power supplied from an alternating current power supply through the power line and the common line, and
  supply the generated direct current through the current loop, and
 wherein at least one of the transmission device or the reception device comprises an adjuster configured to adjust an impedance between the signal line and the common line based on a voltage between the signal line and the common line.

Advantageous Effects of Invention

The present disclosure adjusts the impedance between the signal line and the common line based on the voltage between the signal line and the common line. Thus, the present disclosure improves the noise resistance in serial communication.

DESCRIPTION OF EMBODIMENTS

Embodiment 1

(Configuration of Communication System 1000)

Figure 1:
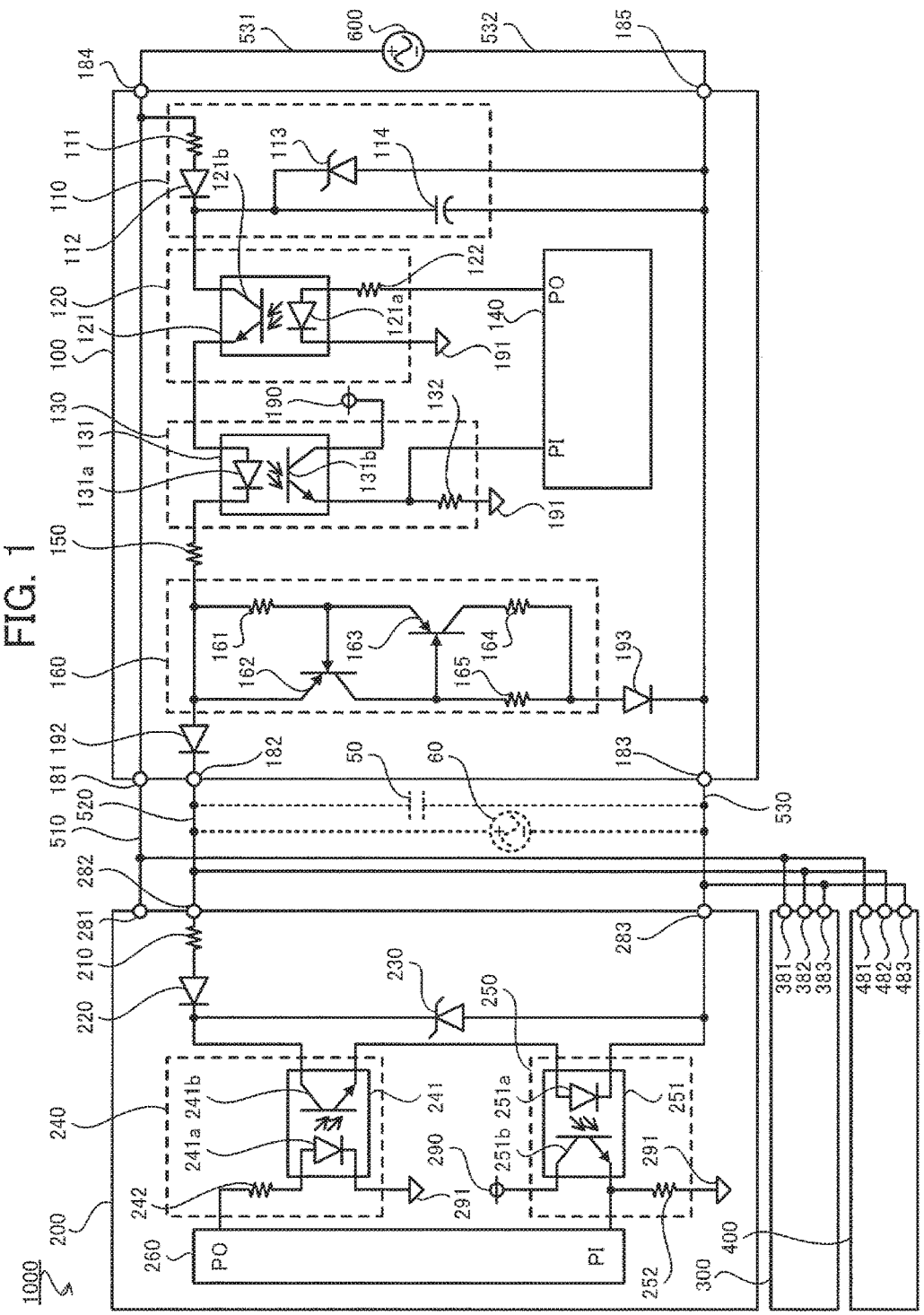
FIG. 1 is a configuration diagram of a communication system according to Embodiment 1 of the present disclosure.

First, the configuration of a communication system 1000 according to Embodiment 1 of the present disclosure is described with reference to FIG. 1. As illustrated in FIG. 1, the communication system 1000 comprises a communication device 100, a communication device 200, a communication device 300, and a communication device 400. In this embodiment, the communication system 1000 is an air conditioning system, the communication device 100 is an outdoor unit, and the communication device 200, the communication device 300, and the communication device 400 are indoor units.

The communication device 200, the communication device 300, and the communication device 400 are connected mutually in parallel to the communication device 100 by each of a power line 510, a signal line 520, and a common line 530. The power line 510 is an electric line set to a power supply potential (an L phase potential) of an alternating current power supply 600. The signal line 520 is an electric line through which a communication current supplied from a direct current power supply 110 flows. The common line 530 is an electric line set to reference potentials (N phase potentials) of the alternating current power supply 600 and the direct current power supply 110 and also an electric line for returning the communication current. The alternating current power supply 600 is an alternating current power supply that supplies alternating current power and is a commercial power supply that outputs, for example, a voltage of 200 V. The connection relationship between the components is specifically described below.

The communication device 100 includes a terminal 181, a terminal 182, a terminal 183, a terminal 184, and a terminal 185. The communication device 200 includes a terminal 281, a terminal 282, and a terminal 283. The communication device 300 includes a terminal 381, a terminal 382, and a terminal 383. The communication device 400 includes a terminal 481, a terminal 482, and a terminal 483. The terminal 181 is connected to each of the terminal 281, the terminal 381, and the terminal 481 by the power line 510. The terminal 182 is connected to each of the terminal 282, the terminal 382, and the terminal 482 by the signal line 520. The terminal 183 is connected to each of the terminal 283, the terminal 383, and the terminal 483 by the common line 530.

The terminal 184 is connected to one end (the L phase terminal) of the alternating current power supply 600 by a power line 531. The terminal 185 is connected to the other end (the N phase terminal) of the alternating current power supply 600 by a common line 532. In other words, the communication device 100 is supplied with alternating current power from the alternating current power supply 600 via the terminal 184 and the terminal 185. Moreover, the communication device 200 is supplied with alternating current power from the alternating current power supply 600 via the terminal 281 and the terminal 283. The communication device 300 is supplied with alternating current power from the alternating current power supply 600 via the terminal 381 and the terminal 383. The communication device 400 is supplied with alternating current power from the alternating current power supply 600 via the terminal 481 and the terminal 483.

In this embodiment, the power line 510, the signal line 520, and the common line 530 are integrated into one cable. Therefore, a not-negligible degree of line capacitance is present among the power line 510, the signal line 520, and the common line 530. For example, line capacitance is present between the signal line 520 and the common line 530. This line capacitance increases in proportion to the length of the signal line 520 and/or the common line 530. The magnitude of this line capacitance also varies depending on the material of the signal line 520 and/or the common line 530 and is, for example, approximately 10000 pF when the length of the signal line 520 and/or the common line 530 is approximately 100 m. A capacitor 50 in FIG. 1 is an imaginary capacitor having this line capacitance.

The method of transferring data in serial communication with a communication current is described next. The communication current is a current flowing through a transfer path (referred to as "the current loop" hereafter) that is a path including the communication device 100, the signal line 520, the communication device of the other party of communication, the common line 530, and the communication device 100 in order thereof. Here, the communication device of the other party of communication is at least one communication device among the communication device 200, the communication device 300, and the communication device 400. When there are multiple communication devices of the other parties of communication, the communication current is split and supplied to the communication devices of the other parties of communication and then combined and returned to the communication device 100.

Data transferred in serial communication are expressed in binary numbers defined by combinations of "1" and "0". When data are transferred from the communication device 100 to the communication device of the other party of communication, the communication device 100 passes or cuts off a communication current in each preset reference period based on the data to transmit. For example, the communication device 100 passes a communication current when "1" should be transmitted and cuts off a communication current when "0" should be transmitted. In such a case, a communication current being passed means that "1" is transmitted and a communication current being cut off means that "0" is transmitted. Here, while the communication device 100 transmits data, the communication device of the other party of communication puts the photocoupler for transmission in the ON state so that a communication current flows through the current loop.

The communication device of the other party of communication determines the presence or absence of a communication current in each reference period and recognizes binary data associated with presence/absence patterns of communication currents as data transmitted by the communication device 100. Here, the logic of "0" and "1" can be inverted as appropriate. The state in which a communication current flows through the current loop is referred to as the current loop being in the conductive state and the state in which a communication current through the current loop is cut off is referred to as the current loop being in the non-conductive state. Moreover, a current loop conductive/non-conductive state refers to being either in the conductive state or in the non-conductive state. Additionally, the conductive state is referred to as the ON state as appropriate and the non-conductive state is referred to as the OFF state as appropriate.

When data are transferred from the communication device of the other party of communication to the communication device 100, the communication device of the other party of communication passes or cuts off a communication current in each reference period based on the data to transmit. Then, the communication device 100 determines the presence or absence of a communication current in each reference period and recognizes binary data associated with absence/presence patterns of communication currents as data transmitted by the communication device of the other party of communication. Here, while the communication device of the other party of communication transmits data, the communication device 100 puts the photocoupler for transmission in the ON state so that a communication current flows through the current loop.

The configuration of the communication device 100 is described next. As illustrated in FIG. 1, the communication device 100 includes a direct current power supply 110, a transmitter 120, a receiver 130, a controller 140, a resistor 150, an adjuster 160, a power supply terminal 190, an earth terminal 191, a diode 192, and a diode 193.

The direct current power supply 110 is a direct current power supply that supplies communication currents used in serial communication. The direct current power supply 110 transforms alternating current power supplied from the alternating current power supply 600 via the terminal 184 and the terminal 185 to direct current power. The direct current power supply 110 outputs a communication voltage of a voltage Vc (V) on the basis of the potential of the common line 530. The direct current power supply 110 is a half-wave rectifier circuit including a resistor 111, a diode 112, an electrolytic capacitor 114, and a Zener diode 113.

The resistor 111 is a resistor that limits the current flowing through the Zener diode 113. One end of the resistor 111 is connected to the terminal 184. The other end of the resistor 111 is connected to the anode of the diode 112. The cathode of the diode 112 is connected to the cathode of the Zener diode 113, the positive terminal of the electrolytic capacitor 114, and the collector of a phototransistor 121b. The Zener diode 113 is a Zener diode of which the breakdown voltage (the voltage between the ends) is Vc (V). The anode of the Zener diode 113 is connected to the negative terminal of the electrolytic capacitor 114, the cathode of the diode 193, the terminal 183, and the terminal 185. The electrolytic capacitor 114 is a capacitor having the polarity and has the function of smoothing the undulating voltage.

The transmitter 120 is a circuit that transmits data by switching the state of the current loop between the conductive state and the non-conductive state. Specifically, the transmitter 120 passes a communication current through the current loop while a parallel output (PO) terminal provided to the controller 140 is at a level H and does not pass a communication current through the current loop while the PO terminal is at a level L. Here, for example, the level H is 5 V and the level L is 0 V. The transmitter 120 includes a photocoupler 121 and a resistor 122.

The photocoupler 121 is an element for electrically insulating two circuits from each other. The photocoupler 121 includes a light emitting diode 121a and a phototransistor 121b. As a primary-side current flows through the light emitting diode 121a, a secondary-side current flows through the current path of the phototransistor 121b. Hereafter, a current flowing through the light emitting diode 121a is called a primary-side current and a current flowing through the phototransistor 121b is called a secondary-side current. Moreover, a voltage applied to the light emitting diode 121a is called a primary-side voltage and a voltage applied between the emitter and the collector of the phototransistor 121b is called a secondary-side voltage.

The light emitting diode 121a allows a primary-side current to flow and emits light at an intensity corresponding to the current value of the primary-side current when the voltage value of the primary-side voltage becomes equal to or higher than a threshold. The anode of the light emitting diode 121a is connected to one end of the resistor 122. The cathode of the light emitting diode 121a is connected to the earth terminal 191. The phototransistor 121b allows a secondary-side current corresponding to the secondary-side voltage and the emission intensity of the light emitting diode 121a to flow from the collector to the emitter. The emitter of the phototransistor 121b is connected to the anode of the light emitting diode 131a.

The resistor 122 is a load resistor that limits the primary-side current flowing from the PO terminal of the controller 140 to the light emitting diode 121a. The other end of the resistor 122 is connected to the PO terminal of the controller 140.

Here, operation of the transmitter 120 is briefly described. First, it is assumed that the photocoupler 241 is kept in the ON state while the transmitter 120 transmits data. When the PO terminal of the controller 140 is at the level H, a current flows through the light emitting diode 121a via the resistor 122. Therefore, the photocoupler 121 is put in the ON state and a communication current flows through the current loop. Conversely, when the PO terminal of the controller 140 is at the level L, no current flows through the light emitting diode 121a. The photocoupler 121, therefore, is put in the OFF state and no communication current flows through the current loop.

The receiver 130 is a circuit that receives data by detecting the presence or absence of a communication current flowing through the current loop. Specifically, the receiver 130 sets a parallel input (PI) terminal provided to the controller 140 to the level H while a communication current flows through the current loop and sets the PI terminal to the level L while no communication current flows through the current loop. The receiver 130 includes a photocoupler 131 and a resistor 132.

The photocoupler 131 has basically the same configuration as the photocoupler 121. The photocoupler 131 includes a light emitting diode 131a and a phototransistor 131b. As a primary-side current flows through the light emitting diode 131a, a secondary-side current flows through the current path of the phototransistor 131b. The cathode of the light emitting diode 131a is connected to one end of the resistor 150. The collector of the phototransistor 131b is connected to the power supply terminal 190. The emitter of the phototransistor 131b is connected to the PI terminal provided to the controller 140 and one end of the resistor 132. The resistor 132 is a load resistor that limits the current flowing through the phototransistor 131b. The other end of the resistor 132 is connected to the earth terminal 191.

Here, operation of the receiver 130 is briefly described. As a communication current flows through the current loop, a current flows through the light emitting diode 131a and the photocoupler 131 is put in the ON state. A current, therefore, flows from the power supply terminal 190 to the earth terminal 191 via the phototransistor 131b and the resistor 132. Thus, the voltage between the ends of the resistor 132 is applied to the PI terminal of the controller 140 and the level of the PI terminal becomes the level H. Whereas, when no communication current flows through the current loop, no current flows through the light emitting diode 131a and the photocoupler 131 is put in the OFF state. Thus, the PI terminal is pulled down to the earth potential by the resistor 132 and the level of the PI terminal becomes the level L.

The controller 140 transmits data by controlling the photocoupler 121. Moreover, the controller 140 receives data based on the state of the photocoupler 131. The controller 140 includes a PO terminal that outputs a voltage of the level H or a voltage of the level L and a PI terminal to which a voltage of the level H or a voltage of the level L is applied. The controller 140 switches the level of the voltage of the PO terminal between the level H and the level L based on data to transmit. Moreover, the controller 140 determines whether the voltage applied to the PI terminal is at the level H or the level L.

The resistor 150 is a current-limiting resistor that limits the current flowing through the current loop. The resistor 150 serves to protect the circuit elements provided to the transmitter 120, the receiver 130, the adjuster 160, and the like. The resistance of the resistor 150 is sufficiently low compared to the resistance of the resistor 210 provided to each of the communication device 200, the communication device 300, and the communication device 400. As a result, voltage drop due to the resistor 150 is less influential and sufficient communication currents can be supplied to the communication device 200, the communication device 300, and the communication device 400. The other end of the resistor 150 is connected to one end of the resistor 161, the emitter of the transistor 162, and the anode of the diode 192.

The adjuster 160 is a circuit that adjusts the line impedance between the signal line 520 and the common line 530 (basically, the line resistance between the signal line 520 and the common line 530) depending on the level of the line voltage between the signal line 520 and the common line 530. The adjuster 160 is connected to the signal line 520 and the common line 530 and adjusts its own impedance (basically, its own resistance) so as to adjust the line impedance between the signal line 520 and the common line 530. The adjuster 160 includes a resistor 161, a transistor 162, a transistor 163, a resistor 164, and a resistor 165.

The resistor 161 is a resistor connected between the emitter and the base of the transistor 162. The other end of the resistor 161 is connected to the base of the transistor 162 and the emitter of the transistor 163. The transistor 162 is a transistor that adjusts the voltage between the base and the emitter of the transistor 163 so that the current flowing through the resistor 161 does not become equal to or higher than a reference value. The collector of the transistor 162 is connected to the base of the transistor 163 and one end of the resistor 165. The transistor 162 is a positive negative positive (PNP) transistor.

The transistor 163 is a transistor that limits a current so that the current value of the current flowing from the signal line 520 to the common line 530 via the adjuster 160 does not become equal to or higher than a reference current value. The collector of the transistor 163 is connected to one end of the resistor 164. The resistor 164 is a resistor having a sufficiently low resistance compared to the resistor 210 provided to the indoor unit 200. The other end of the resistor 164 is connected to the other end of the resistor 165 and the anode of the diode 193. The resistor 165 is a resistor having a sufficiently high resistance compared to the resistor 164. Operation of the adjuster 160 is described below.

The power supply terminal 190 and the earth terminal 191 are terminals connected to a direct current power supply (not shown, for example, an operation power supply of the controller 140) other than the direct current power supply 110 and insulated from the alternating current power supply 600. The potential of the power supply terminal 190 is of the level H (for example, 5 V). The potential of the earth terminal 191 is the earth potential (for example, 0 V).

The diode 192 and the diode 193 are rectifying elements that pass a current only in the direction from the anode to the cathode. The diode 192 and the diode 193 cut off reverse currents that may flow through the current loop due to improper wiring or the like. The diode 192 and the diode 193 serve to protect the circuit elements constituting the transmitter 120, the receiver 130, the adjuster 160, and the like. The cathode of the diode 192 is connected to the terminal 182.

The configuration of the communication device 200 is described next. The communication device 200 includes a resistor 210, a diode 220, a Zener diode 230, a transmitter 240, a receiver 250, a controller 260, a power supply terminal 290, and an earth terminal 291.

The resistor 210 is a current-limiting resistor that is integrated in the current loop and limits the communication current flowing through the current loop within the communication device 200. The resistor 210 serves to protect the circuit elements constituting the transmitter 240 and the receiver 250 provided to the communication device 200. The resistance of the resistor 210 is set, for example, to a magnitude in a range from a few kΩ to a few tens kΩ. One end of the resistor 210 is connected to the terminal 282 and the other end of the resistor 210 is connected to the anode of the diode 220.

The diode 220 is a rectifying element for passing a current only in the direction from the anode to the cathode. The diode 220 serves to cut off a reverse current that may flow through the current loop due to improper wiring or the like. The cathode of the diode 220 is connected to the cathode of the Zener diode 230 and the collector of the phototransistor 241b.

The Zener diode 230 is a diode through which almost no reverse current flows when the reverse voltage applied between the anode and the cathode is lower than the breakdown voltage and a reverse current dramatically increases flowing when the reverse voltage becomes equal to or higher than the breakdown voltage. The Zener diode 230 serves to protect the circuit elements constituting the transmitter 240 and the receiver 250 provided to the communication device 200 when an excess voltage or a reverse voltage is applied between the terminal 282 and the terminal 283 due to improper wiring or the like. The anode of the Zener diode 230 is connected to the cathode of the light emitting diode 251a and the terminal 283.

The transmitter 240 is a circuit that transmits data by switching the state of the current loop between the conductive state and the non-conductive state. Specifically, the transmitter 240 passes a communication current through the current loop while the PO terminal provided to the controller 260 is at the level H and does not pass a communication current through the current loop while the PO terminal is at the level L. The transmitter 240 includes a photocoupler 241 and a resistor 242.

The photocoupler 241 has basically the same configuration as the photocoupler 121. The photocoupler 241 includes a light emitting diode 241a and a phototransistor 241b. As a primary-side current flows through the light emitting diode 241a, a secondary-side current flows through the current path of the phototransistor 241b. The anode of the light emitting diode 241a is connected to one end of the resistor 242. The cathode of the light emitting diode 241a is connected to the earth terminal 291. The emitter of the phototransistor 241b is connected to the anode of the light emitting diode 251a. The resistor 242 is a load resistor that limits the primary-side current flowing through the light emitting diode 241a. The other end of the resistor 242 is connected to the PO terminal provided to the controller 260.

Here, operation of the transmitter 240 is briefly described. First, it is assumed that the photocoupler 121 is kept in the ON state while the transmitter 240 transmits data. When the PO terminal of the controller 260 is at the level H, a current flows through the light emitting diode 241a via the resistor 242. Therefore, the photocoupler 241 is put in the ON state and a communication current flows through the current loop. Whereas, when the PO terminal of the controller 260 is at the level L, no current flows through the light emitting diode 241a. The photocoupler 241, therefore, is put in the OFF state and no current flows through the current loop.

The receiver 250 is a circuit that receives data by detecting the presence or absence of a communication current flowing through the current loop. Specifically, the receiver 250 sets the PI terminal provided to the controller 260 to the level H while a communication current flows through the current loop and sets the PI terminal to the level L while no communication current flows through the current loop. The receiver 250 includes a photocoupler 251 and a resistor 252.

The photocoupler 251 has basically the same configuration as the photocoupler 121. The photocoupler 251 includes a light emitting diode 251a and a phototransistor 251b. As a primary-side current flows through the light emitting diode 251a, a secondary-side current flows through the current path of the phototransistor 251b. The collector of the phototransistor 251b is connected to the power supply terminal 290. The emitter of the phototransistor 251b is connected to one end of the resistor 252 and the PI terminal provided to the controller 260. The resistor 252 is a load resistor that limits the current flowing through the phototransistor 251b. The other end of the resistor 252 is connected to the earth terminal 291.

Here, operation of the receiver 250 is briefly described. When a communication current flows through the current loop, a current flows through the light emitting diode 251a and the photocoupler 251 is put in the ON state. Therefore, a current flows from the power supply terminal 290 to the earth terminal 291 via the phototransistor 251b and the resistor 252. At this point, the voltage that occurs between the ends of the resistor 252 is entered into the PI terminal of the controller 260 and the level of the PI terminal becomes the level H. Whereas, when no communication current flows through the current loop, no current flows through the light emitting diode 251a and the photocoupler 251 is put in the OFF state. Thus, the PI terminal is pulled down to the earth potential by the resistor 252 and the level of the PI terminal becomes the level L.

The controller 260 transmits data by controlling the state of the photocoupler 241. Moreover, the controller 260 receives data based on the state of the photocoupler 251. The controller 260 includes a PO terminal that outputs a voltage of the level H or a voltage of the level L and a PI terminal into which a voltage of the level H or a voltage of the level L is entered. The controller 260 switches the level of the voltage output from the PO terminal between the level H and the level L based on data to transmit. Moreover, the controller 260 determines whether the voltage entered into the PI terminal is at the level H or the level L.

The power supply terminal 290 and the earth terminal 291 are terminals connected to a direct current power supply (not shown, for example, an operation power supply of the controller 260) other than the direct current power supply 110 and insulated from the alternating current power supply 600. The potential of the power supply terminal 290 is of the level H (for example, 5 V). The potential of the earth terminal 291 is the earth potential (for example, 0 V).

The communication device 300 and the communication device 400 each have the same configuration as the communication device 200. In other words, the communication device 300 and the communication device 400 each communicate with the communication device 100 through the signal line 520 and the common line 530.

(Operation of Communication System 1000)

Operation of the communication device 100, the communication device 200, the communication device 300, and the communication device 400 when the communication device 100, the communication device 200, the communication device 300, and the communication device 400 communicate through serial communication through the signal line 520 and the common line 530 is described next. First, operation when data are transmitted by the communication device 100 to at least one of the communication device 200, the communication device 300, or the communication device 400 is described.

First, the communication device 200, the communication device 300, and the communication device 400 keep the photocoupler 241 in the ON state. Then, the communication device 100 passes or cuts off a communication current by putting the photocoupler 121 in the ON state or in the OFF state in each preset reference period based on data to transmit. At this point, the communication device 200, the communication device 300, and the communication device 400 receive data by detecting the state of the photocoupler 251 in each preset reference period.

Operation when data are transmitted by any one of the communication device 200, the communication device 300, and the communication device 400 to the communication device 100 is described next. First, operation when data are transmitted by the communication device 200 to the communication device 100 is described.

First, the communication device 100 keeps the photocoupler 121 in the ON state. Moreover, the communication device 300 and the communication device 400 keep the photocoupler 241 in the ON state. Then, the communication device 200 passes or cuts off a communication current by putting the photocoupler 241 in the ON state or in the OFF state in each preset reference period based on data to transmit. At this point, the communication device 100 receives data by detecting the state of the photocoupler 131 in each preset reference period. The same applies when the communication device 300 or the communication device 400 transmits data to the communication device 100.

Operation of the adjuster 160 provided to the communication device 100 is described next.

The adjuster 160 adjusts the line impedance between the signal line 520 and the common line 530 depending on the level of the line voltage between the signal line 520 and the common line 530. Specifically, the adjuster 160 keeps the impedance at a constant value when the line voltage between the signal line 520 and the common line 530 is lower than a reference voltage (Vth1). Whereas, when the line voltage is equal to or higher than the reference voltage, the adjuster 160 increases the impedance as the line voltage is higher. Here, the reference voltage has a value higher than the maximum value of the inductive voltage that occurs when the adjuster 160 sets a low impedance between the signal line 520 and the common line 530.

The above inductive voltage is an inductive voltage due to the line capacitance between the power line 510 and the signal line 520 and, for example, a voltage due to noise radiated by the power line 510 to the signal line 520. A power supply 60 illustrated in FIG. 1 is an imaginary power supply that generates an inductive voltage. The voltage level of this inductive voltage is proportional to the line capacitance between the power line 510 and the signal line 520 and the line impedance between the signal line 520 and the common line 530. The voltage level of the inductive voltage, therefore, can be lowered by reducing the line impedance between the signal line 520 and the common line 530.

However, for example, when the line voltage between the signal line 520 and the common line 530 is sufficiently high like while the photocoupler 121 is in the ON state, reducing the line impedance between the signal line 520 and the common line 530 causes a wasteful current flowing from the signal line 520 to the common line 530. Thus, the adjuster 160 adjusts the line impedance based on the line voltage between the signal line 520 and the common line 530 so that no false detection of data occurs and there is no wasteful current consumption.

Figure 2:
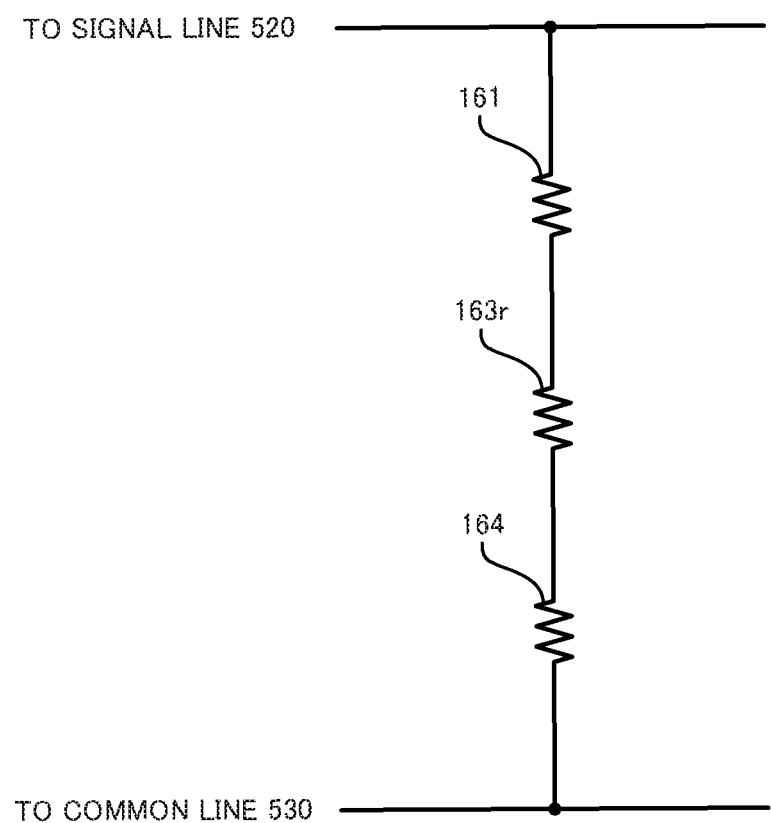
FIG. 2 is a diagram illustrating an equivalent circuit of an adjuster.

FIG. 2 shows an equivalent circuit of the adjuster 160. As illustrated in FIG. 2, the adjuster 160 can be considered to be a circuit in which a resistor 161, an impedance (resistor) 163r, and a resistor 164 are series-connected. As illustrated in FIG. 2, the resistor 165 is omitted because of its significantly high resistance compared to that of the resistor 161 and the resistor 162. Moreover, the resistor 163r is the impedance of the transistor 163 and changes based on the line voltage between the signal line 520 and the common line 530.

Figure 3:
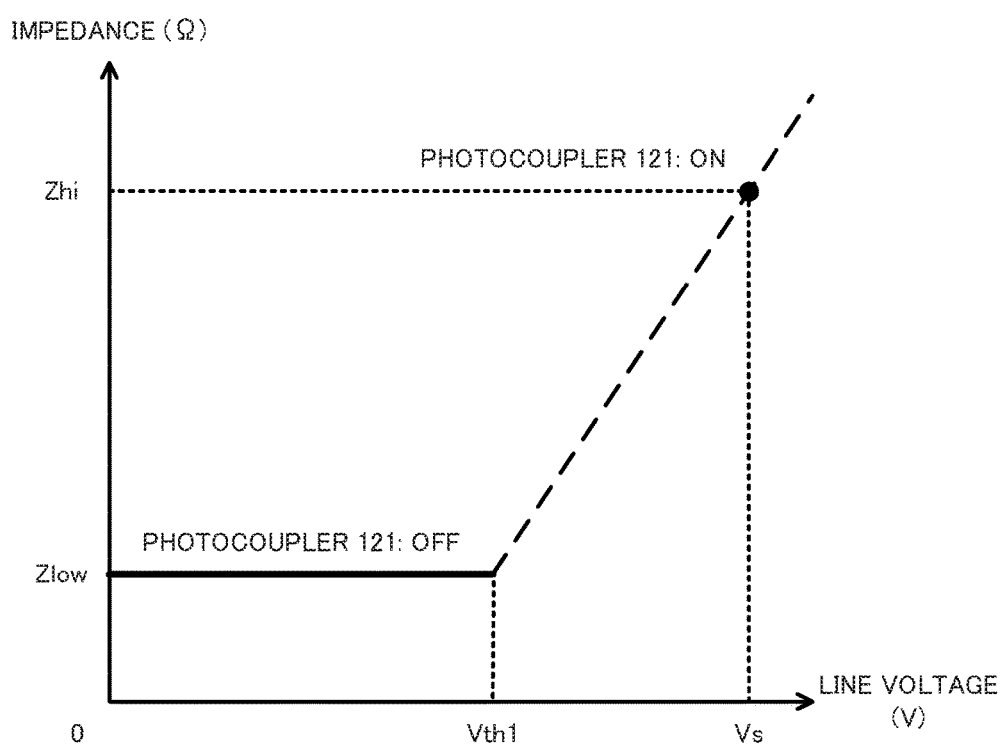
FIG. 3 is a diagram illustrating the relationship between the line voltage between a signal line and a common line and the impedance of the adjuster.

The relationship between the line voltage between the signal line 520 and the common line 530 and the impedance of the adjuster 160 is described next with reference to FIG. 3. Here, for easier understanding, influence of the forward voltage of the diode 193, the voltage between the emitter and the collector of the transistor 163, and the like are omitted.

First, the line voltage between the signal line 520 and the common line 530 is divided between the resistor 161 and the resistor 164. Here, when the line voltage between the signal line 520 and the common line 530 is lower than Vth1, the voltage between the ends of the resistor 161 is lower than a specific value (for example, approximately 0.7 V). In such a case, the transistor 162 is in the OFF state and therefore, no adjustment is made to the voltage between the base and the emitter of the transistor 163. In such a case, the resistor 163 is in the ON state and the impedance of the impedance 163r can be considered to be a low impedance (sufficiently lower than the resistance of the resistor 164). Thus, the impedance of the adjuster 160 is nearly equal to the total value of the resistance of the resistor 161 and the resistance of the resistor 164 and thus a low impedance (Zlow). For example, when the photocoupler 121 is in the OFF state, the line voltage between the signal line 520 and the common line 530 is a voltage nearly equal to the inductive voltage and lower than Vth1. Therefore, when the photocoupler 121 is in the OFF state, the impedance of the adjuster 160 is a low impedance. Here, when the photocoupler 121 is in the OFF state and the adjuster 160 is absent, since the resistance of the resistor 210 is sufficiently high, the impedance between the signal line 520 and the common line 530 increases and the inductive voltage also increases. As just stated, the adjuster 160 can keep the impedance between the signal line 520 and the common line 530 low.

Conversely, when the line voltage between the signal line 520 and the common line 530 is equal to or higher than Vth1, the voltage between the ends of the resistor 161 reaches a specific value (for example, approximately 0.7 V). In such a case, the transistor 162 adjusts the voltage between the base and the emitter of the transistor 163 to limit the current flowing through the resistor 161 in order to keep the voltage between the base and the emitter of the transistor 162 (the voltage between the ends of the resistor 161) at a specific value (for example, approximately 0.7 V). In such a case, the transistor 162 and the transistor 163 operate in an active range, not in the ON state, and the current flowing through the resistor 163 does not increase even if the line voltage between the signal line 520 and the common line 530 rises; therefore, the impedance 163r is considered to be increased. For example, when the photocoupler 121 is in the ON state, the line voltage between the signal line 520 and the common line 530 is Vs equal to or higher than Vth1. Therefore, when the photocoupler 121 is in the ON state, the impedance of the adjuster 160 is a high impedance (Zhi). In FIG. 3, Vs is the line voltage between the signal line 520 and the common line 530 when the photocoupler 121 is in the ON state. When the photocoupler 121 is in the ON state, the impedance between the signal line 520 and the common line 530 is kept low by the resistor 150 compared to when the photocoupler 121 is in the OFF state. Therefore, the inductive voltage is also lower compared to when the photocoupler 121 is in the OFF state.

Figure 4:
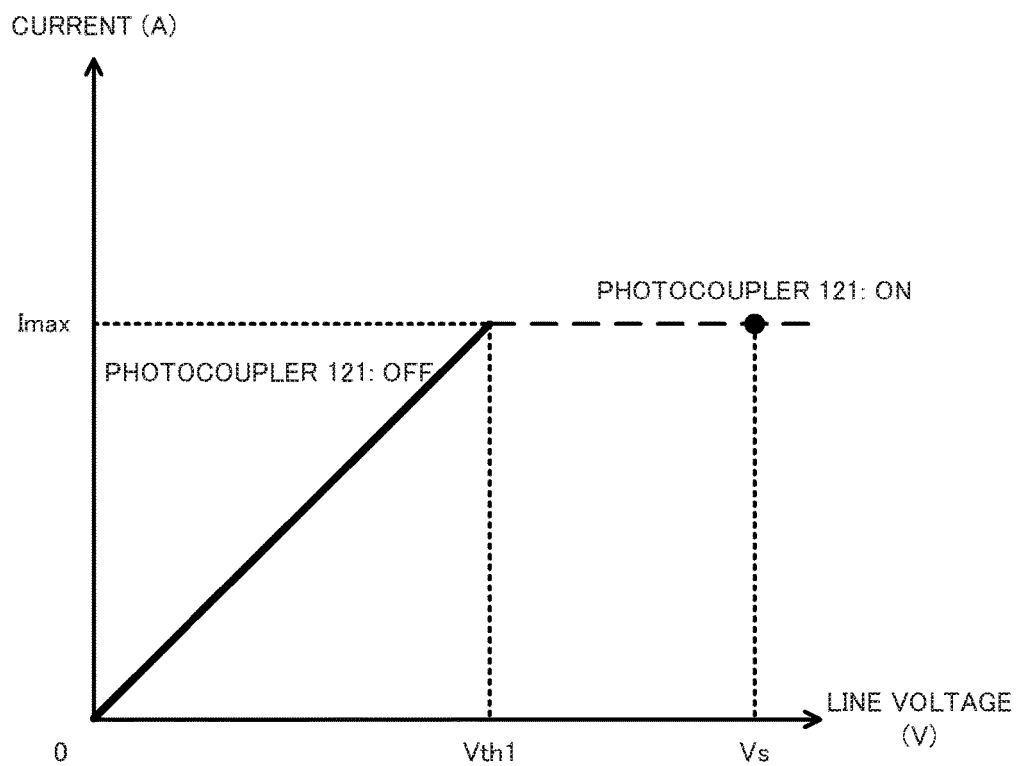
FIG. 4 is a diagram illustrating the relationship between the line voltage between the signal line and the common line and the current flowing through the adjuster.

It can be said that the relationship between the line voltage between the signal line 520 and the common line 530 and the impedance of the adjuster 160 is the relationship between the line voltage between the signal line 520 and the common line 530 and the current flowing through the adjuster 160. The relationship between the line voltage between the signal line 520 and the common line 530 and the current flowing through the adjuster 160 is described below with reference to FIG. 4.

First, when the photocoupler 121 is in the OFF state, the line voltage between the signal line 520 and the common line 530 is a voltage nearly equal to the inductive voltage and lower than Vth1. Thus, when the photocoupler 121 is in the OFF state, the current flowing through the adjuster 160 is proportional to the line voltage between the signal line 520 and the common line 530.

Conversely, when the photocoupler 121 is in the ON state, the line voltage between the signal line 520 and the common line 530 is equal to or higher than Vth1. Thus, the current flowing through the adjuster 160 when the photocoupler 121 is in the ON state is kept at a reference current value (Imax) regardless of the line voltage between the signal line 520 and the common line 530.

The reason that false detection of data is suppressed by the adjuster 160 is described next with reference to FIGS. 5 and 6. Here, a case in which data are transmitted from the communication device 100 to the communication device 200 is described. First, as a comparative example, the reason that false detection of data occurs when the communication system 1000 does not include the adjuster 160 is described with reference to FIG. 5.

Figure 5:
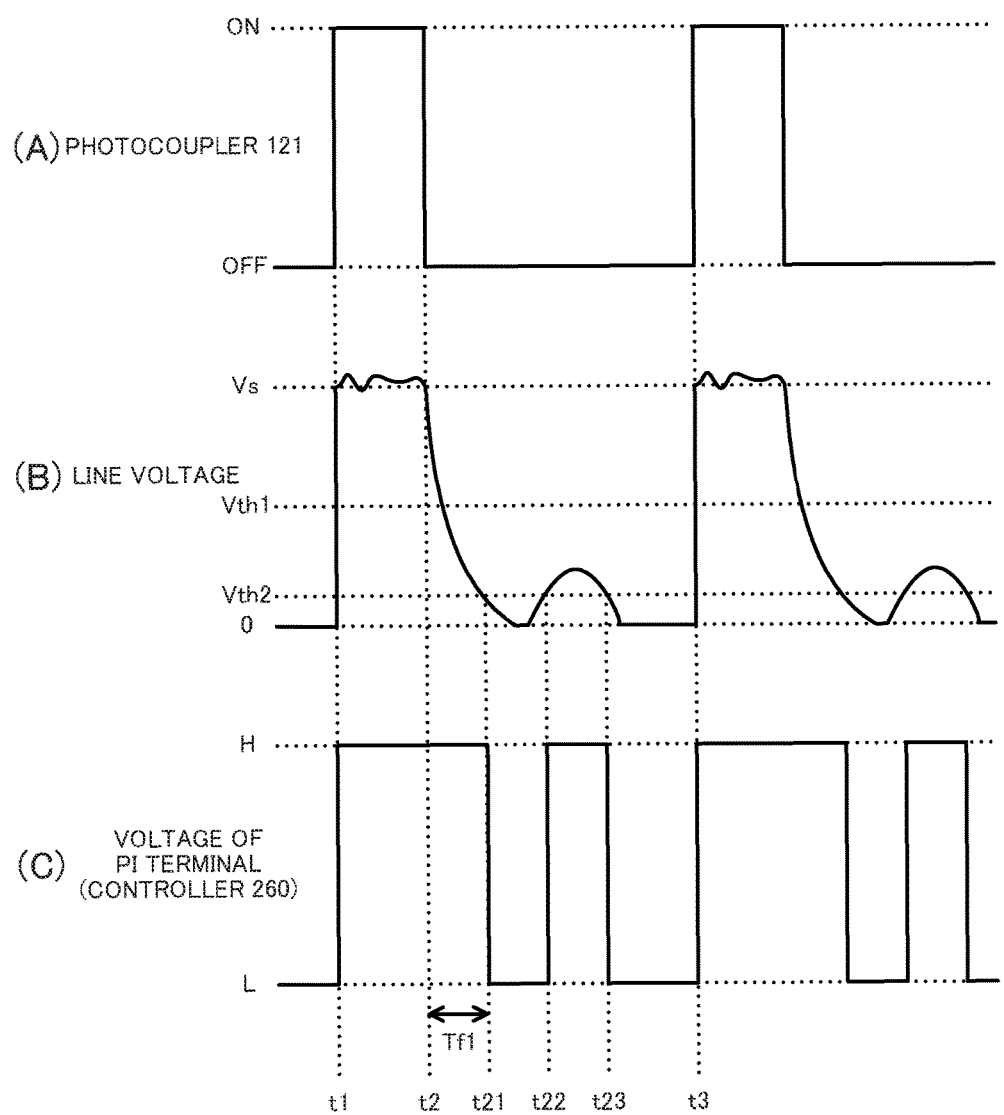
FIG. 5 is a timing chart for describing the reason that false detection of data occurs when the communication system does not include the adjuster, the timing chart including section (A) illustrating the changes of the state of a photocoupler 121, section (B) illustrating the changes of the line voltage between the signal line and the common line, and section (C) illustrating the changes of the voltage of a PI terminal provided to a controller 260.

Section (A) of FIG. 5 is a portion of a timing chart, illustrating the changes of the state of the photocoupler 121. It is assumed that the photocoupler 121 is in the OFF state until t1, in the ON state from t1 to t2, and in the OFF state from t2 to t3. In such a case, in the configuration without the adjuster 160, even if the photocoupler 121 is in the OFF state, the resistance of the resistor 210 is sufficiently high and thus the line impedance between the signal line 520 and the common line 530 is high.

Here, the discharge time (time constant) due to the line capacitance between the signal line 520 and the common line 530 is proportional to the product of the magnitude of the line capacitance and the magnitude of the resistance component of the line impedance between the signal line 520 and the common line 530. Therefore, when the line impedance between the signal line 520 and the common line 530 is high, the discharge time is long.

Therefore, as illustrated in FIG. 5, section (B), even though the photocoupler 121 is put in the OFF state at t2, the line voltage between the signal line 520 and the common line 530 keeps its value equal to or higher than Vth2 for Tf1 from t2 to t21. Consequently, as illustrated in FIG. 5, section (C), the voltage of the PI terminal provided to the controller 260 keeps the level H from t1 to t21. Here, Tf1 is a delay time taken from when the photocoupler 121 is put in the OFF state to when the controller 260 detects the OFF state.

Moreover, Vth2 is a voltage threshold for the controller 260 to determine whether the voltage of the PI terminal is at the level H or the level L.

Moreover, as illustrated in FIG. 5, section (B), as an inductive voltage occurs between the signal line 520 and the common line 530, the line voltage between the signal line 520 and the common line 530 has values equal to or higher than Vth2 from t22 to t23. Consequently, as illustrated in FIG. 5, section (C), the potential of the PI terminal provided to the controller 260 is of the level H from t22 to t23. As just stated, in the configuration without the adjuster 160, the inductive voltage that occurs between the signal line 520 and the common line 530 may cause the photocoupler 251 to falsely detect data.

The reason that no false detection of data occurs when the communication system 1000 includes the adjuster 160 is described next with reference to FIG. 6.

Figure 6:
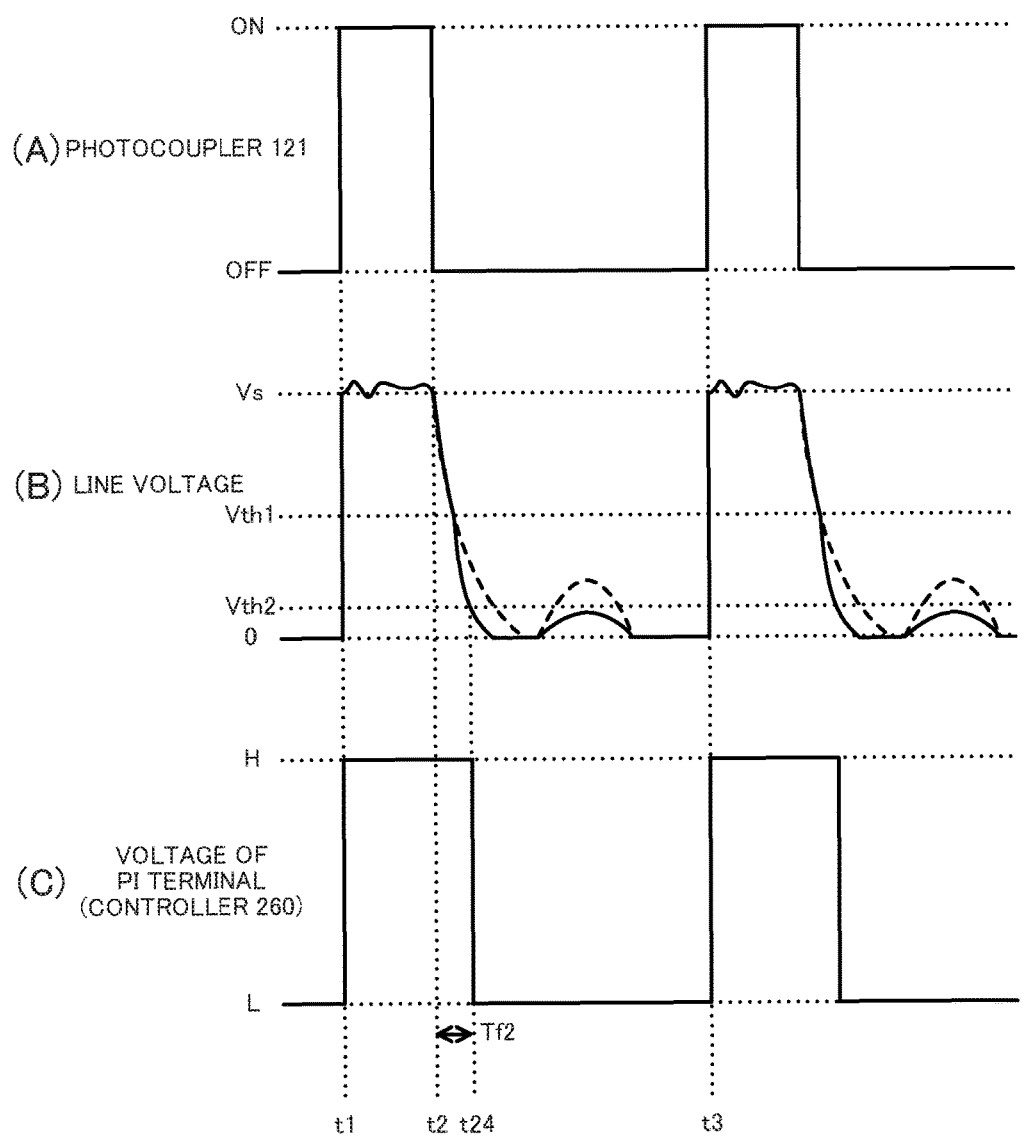
FIG. 6 is a timing chart for describing the reason that false detection of data does not occur when the communication system includes the adjuster, the timing chart including section (A) illustrating the changes of the state of the photocoupler 121, section (B) illustrating the changes of the line voltage between the signal line and the common line, and section (C) illustrating the changes of the voltage of the PI terminal provided to the controller 260.

Section (A) of FIG. 6 is a portion of a timing chart, illustrating the changes of the state of the photocoupler 121. It is assumed that the photocoupler 121 is in the OFF state until t1, in the ON state from t1 to t2, and in the OFF state from t2 to t3. In such a case, in the configuration with the adjuster 160, when the photocoupler 121 is in the OFF state, the impedance of the adjuster 160 is a low impedance and thus the line impedance between the signal line 520 and the common line 530 is low. Here, as the line impedance between the signal line 520 and the common line 530 is low, the discharge time is short.

Therefore, as illustrated in FIG. 6, section (B), after the photocoupler 121 is put in the OFF state at t2, the line voltage between the signal line 520 and the common line 530 keeps its value equal to or higher than Vth2 for Tf2 from t2 to t24, where Tf2 is shorter than Tf1. Consequently, as illustrated in FIG. 6, section (C), the potential of the PI terminal provided to the controller 260 keeps the level H from t1 to t24. As just stated, in the configuration with the adjuster 160, compared to the configuration without the adjuster 160, the delay time taken for the controller 260 to detect the OFF state is shorter by Tf1−Tf2.

Moreover, as illustrated in FIG. 6, section (B), even if an inductive voltage occurs between the signal line 520 and the common line 530, the voltage level of the inductive voltage can be suppressed to Vth2 or lower. The noise current due to the inductive voltage more easily flows to the adjuster 160 having impedance lower than that of the resistor 210. Consequently, as illustrated in FIG. 6, section (C), the potential of the PI terminal provided to the controller 260 keeps the level L from t24 to t3. As just stated, in the configuration with the adjuster 160, false detection of data by the photocoupler 251 can be prevented.

In the configuration with the adjuster 160, when the photocoupler 121 is in the ON state, the impedance of the adjuster 160 is a high impedance and thus the line impedance between the signal line 520 and the common line 530 is high. Therefore, a wasteful current flowing through the adjuster 160 when the current loop is in the conductive state can be reduced.

In this embodiment, the line impedance between the signal line 520 and the common line 530 is adjusted based on the line voltage between the signal line 520 and the common line 530. In more detail, the adjuster 160 keeps the impedance of the adjuster 160 at a reference value when the line voltage between the signal line 520 and the common line 530 is lower than a reference voltage. Consequently, when the photocoupler 121 provided to the communication device 100 is in the OFF state, the voltage level of the inductive voltage due to the line capacitance between the power line 510 and the signal line 520 is lowered and the noise current caused by this inductive voltage flows from the signal line 520 to the common line 530 via the adjuster 160. Therefore, according to this embodiment, false detection of data due to the noise current caused by the inductive voltage is prevented and the noise resistance in serial communication is improved.

Moreover, in this embodiment, when the line voltage between the signal line 520 and the common line 530 is equal to or higher than a reference voltage, the adjuster 160 increases the impedance of the adjuster 160 in proportion to the difference between the line voltage and a threshold. Thus, for example, when the photocoupler 121 provided to the communication device 100 is in the ON state, the current flowing from the signal line 520 to the common line 530 via the adjuster 160 is reduced. As just stated, according to this embodiment, the noise resistance is improved with low power consumption compared to when a resistor is inserted between the signal line 520 and the common line 530 to lower the line impedance between the signal line 520 and the common line 530.

In this embodiment, when the photocoupler 121 is switched from the ON state to the OFF state, the impedance of the adjuster 160 drops and therefore, the discharge time of the remaining charge is shortened. Consequently, the delay time taken from when the photocoupler 121 is put in the OFF state to when the photocoupler 251 detects the OFF state is shortened and improvement in the communication speed can be expected.

Moreover, in this embodiment, the adjuster 160 includes transistors and resistors, which are relatively low in cost compared to elements such as photocouplers. Thus, according to this embodiment, the noise resistance can be improved at low cost. Moreover, transistors are generally faster in response speed than that of elements such as photocouplers. Thus, according to this embodiment, the line impedance between the signal line 520 and the common line 530 can quickly be adjusted.

Moreover, in this embodiment, the adjuster 160 can adjust the line impedance between the signal line 520 and the common line 530 without necessity of control by an external source (for example, control by the controller 140). Thus, no configuration to insulate the secondary-side circuits such as the controller 140 from the signal line 520 and the like (for example, a photocoupler) needs to be provided to the adjuster 160. Thus, according to this embodiment, the noise resistance can be improved at low cost and with a simple configuration.

Moreover, in this embodiment, improvement in the noise resistance is achieved by the adjuster 160 that is an electric circuit without adding redundancy to communication data. Thus, according to this embodiment, the noise resistance can be improved without lowering the communication speed.

Embodiment 2

Figure 7:
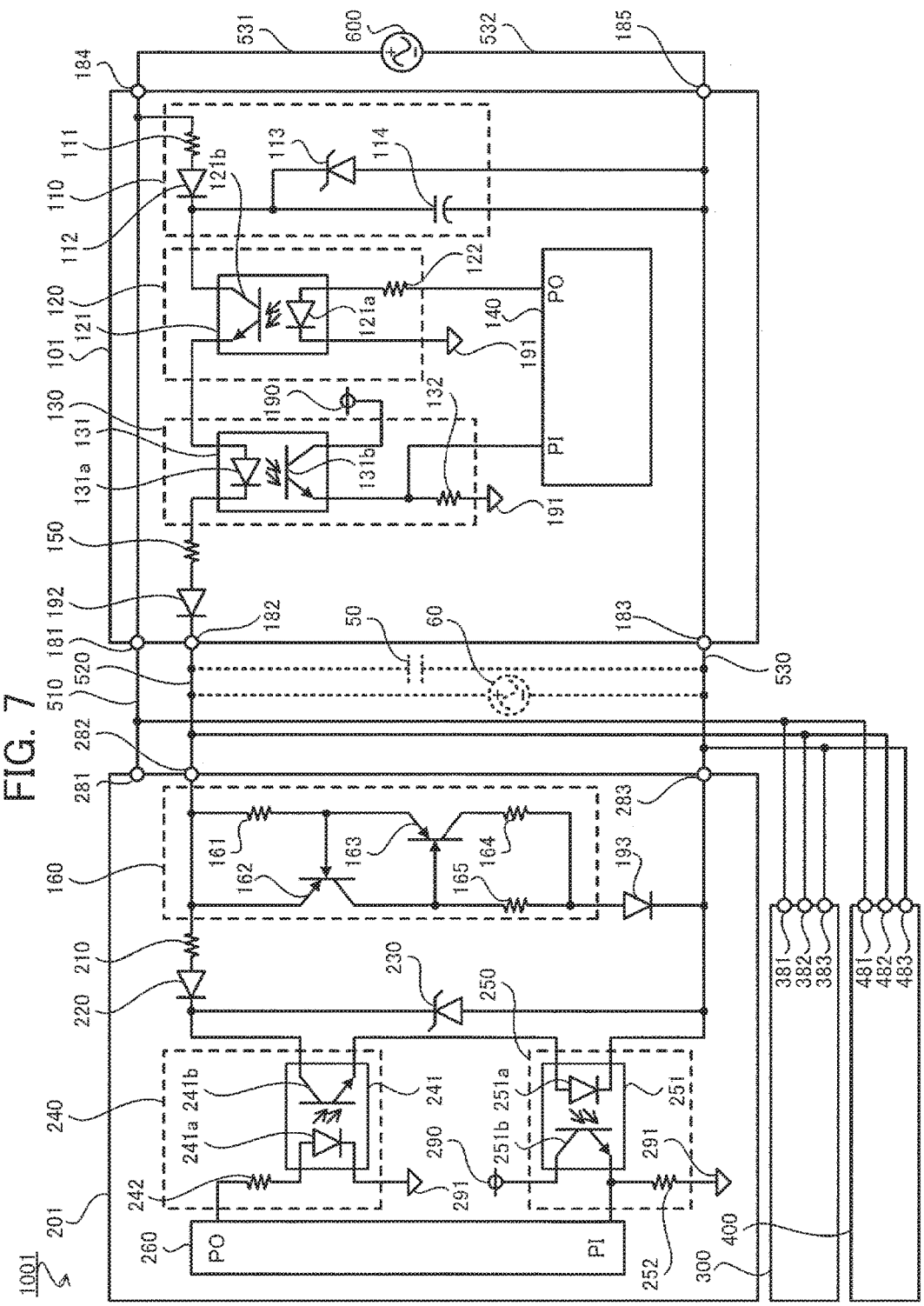
FIG. 7 is a configuration diagram of a communication system according to Embodiment 2 of the present disclosure.

The configuration of a communication system 1001 according to Embodiment 2 of the present disclosure is described next with reference to FIG. 7. As illustrated in FIG. 7, the communication system 1001 includes a communication device 101, a communication device 201, a communication device 300, and a communication device 400. The communication device 101 has the configuration of the communication device 100 from which the adjuster 160 is eliminated and the communication device 201 has the configuration of the communication device 200 to which the adjuster 160 is added. In other words, the communication system 1001 has basically the same configuration as that of the communication system 1000 except that the communication device including the adjuster 160 is different.

The adjuster 160 includes a resistor 161, a transistor 162, a transistor 163, a resistor 164, and a resistor 165. One end of the resistor 161 is connected to the terminal 282, one end of the resistor 210, and the emitter of the transistor 162. The other end of the resistor 161 is connected to the base of the transistor 162 and the emitter of the transistor 163. The collector of the transistor 162 is connected to the base of the transistor 163 and one end of the resistor 165. The collector of the transistor 163 is connected to one end of the resistor 164. The other end of the resistor 164 is connected to the other end of the resistor 165 and the anode of the diode 193.

Operation of the adjuster 160 is the same as that in Embodiment 1. In other words, the adjuster 160 keeps the impedance of the adjuster 160 at a reference value when the line voltage between the signal line 520 and the common line 530 is lower than a reference voltage. Moreover, the adjuster 160 increases the impedance of the adjuster 160 in proportion to the difference between the line voltage and a threshold when the line voltage between the signal line 520 and the common line 530 is equal to or higher than the reference voltage.

In this embodiment, the line impedance between the signal line 520 and the common line 530 is adjusted based on the line voltage between the signal line 520 and the common line 530. Thus, according to this embodiment, the noise resistance in serial communication is improved.

Modified Embodiment

Embodiments of the present disclosure are described above. In implementing the present disclosure, modifications and applications in various modes are available.

In the present disclosure, any parts of the configurations, functions, and operations described in the above embodiments may optionally be used. Moreover, in the present disclosure, besides the above-described configurations, functions, and operations, additional configurations, functions, and operations may be used. Moreover, the configurations, functions, and operations described in the above embodiments can freely be combined.

In Embodiment 1 and Embodiment 2, a case is described in which the present disclosure is applied to a communication system in which two-way communication is available among communication devices. Additionally, the present disclosure is applicable to a communication system in which one-way communication is available among communication devices. For example, the present disclosure is applicable to a communication system including a communication device that is the communication device 100 from which the receiver 130 is eliminated and a communication device that is the communication device 200 from which the transmitter 240 is eliminated. Such a communication system is, for example, a communication system including a monitoring device and a monitored device or a communication system including a control device and a controlled device. Also in such communication systems, improvement in the noise resistance in serial communication can be expected.

In Embodiment 1, a case is described in which the communication system 1000 is an air conditioning system, in other words a case in which the communication device 100 is an outdoor unit and the communication device 200 is an indoor unit. Similarly, in Embodiment 2, a case is described in which the communication system 1001 is an air conditioning system, in other words a case in which the communication device 101 is an outdoor unit and the communication device 201 is an indoor unit. The systems to which the present disclosure is applicable are not limited to air conditioning systems. The present disclosure is applicable to communication systems including communication devices mutually connected by the signal line 520 and the common line 530 and mutually communicating through serial communication through the signal line 520 and the common line 530. For example, the present disclosure is applicable to lighting systems including a lighting control device and a lighting device.

In the above embodiments, the configuration in which the communication device 100 includes the direct current power supply 110 and is supplied with power from the alternating current power supply 600 is described. In the present disclosure, the configuration in which the communication device 200 includes the direct current power supply 110 and is supplied with power from the alternating current power supply 600 may be used.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is applicable to communication systems that perform serial-communication using a current loop.

REFERENCE SIGNS LIST

50 Capacitor
60 Power supply
100, 101, 200, 201, 300, 400 Communication device
110 Direct current power supply
111, 122, 132, 150, 161, 164, 165, 210, 242, 252 Resistor
112, 192, 193, 220 Diode
113, 230 Zener diode
114 Electrolytic capacitor
120, 240 Transmitter
121, 131, 241, 251 Photocoupler
121a, 131a, 241a, 251a Light emitting diode
121b, 131b, 241b, 251b Phototransistor
130, 250 Receiver
140, 260 Controller
160 Adjuster
162, 163 Transistor
163r Impedance
181, 182, 183, 184, 185, 281, 282, 283, 381, 382, 383, 481, 482, 483 Terminal
190, 290 Power supply terminal
191, 291 Earth terminal
510, 531 Power line
520 Signal line
530, 532 Common line
600 Alternating current power supply
1000, 1001 Communication system

The invention claimed is:

1. A communication system comprising:
   a transmission device configured to transmit data by control of current passing through a current loop, the current loop comprising a signal line and a common line connected in series; and
   a reception device connected to the transmission device by the signal line, the common line, and a power line, and configured to receive the data by detection of current passing through the current loop,
   wherein at least one of the transmission device or the reception device comprises a direct current power supply configured to
      generate a direct current for serial communication from an alternating current power supplied from an alternating current power supply through the power line and the common line, and
      supply the generated direct current through the current loop, and
   wherein at least one of the transmission device or the reception device comprises an adjuster configured to adjust an impedance between the signal line and the common line based on a voltage between the signal line and the common line, and
   the adjuster is a circuit connected to the signal line and the common line and configured to pass a current having a value equal to or lower than a reference current value from the signal line to the common line based on the voltage between the signal line and the common line.

2. The communication system according to claim 1, wherein
   an impedance of the adjuster is kept at a reference value when the voltage between the signal line and the common line is lower than a reference voltage and increases in proportion to a difference between the reference voltage and the voltage between the signal line and the common line when the voltage between the signal line and the common line is equal to or higher than the reference voltage.

3. A transmission device for connection to a reception device by a signal line, a common line, and a power line, the transmission device comprising:
   a transmitter configured to transmit data by control of current that is a direct current for serial communication generated by a direct current power supply supplied with alternating current power from an alternating current power supply through the power line and the common line and that flows through a current loop comprising the signal line and the common line connected in series; and
   an adjuster configured to adjust an impedance between the signal line and the common line according to a voltage between the signal line and the common line, wherein
   the adjuster is a circuit connected to the signal line and the common line and configured to pass a current having a value equal to or lower than a reference current value from the signal line to the common line based on the voltage between the signal line and the common line.

4. A reception device for connection to a transmission device by a signal line, a common line, and a power line, the reception device comprising:
   a receiver configured to receive data by detection of current that is a direct current for serial communication generated by a direct current power supply supplied with alternating current power from an alternating current power supply through the power line and the common line and that flows through a current loop comprising the signal line and the common line connected in series; and
   an adjuster configured to adjust an impedance between the signal line and the common line based on a voltage between the signal line and the common line, wherein
   the adjuster is a circuit connected to the signal line and the common line and configured to pass a current having a value equal to or lower than a reference current value from the signal line to the common line based on the voltage between the signal line and the common line.

5. The transmission device according to claim 3, wherein
   an impedance of the adjuster is kept at a reference value when the voltage between the signal line and the common line is lower than a reference voltage and increases in proportion to a difference between the reference voltage and the voltage between the signal line and the common line when the voltage between the signal line and the common line is equal to or higher than the reference voltage.

6. The reception device according to claim 4, wherein
   an impedance of the adjuster is kept at a reference value when the voltage between the signal line and the common line is lower than a reference voltage and increases in proportion to a difference between the reference voltage and the voltage between the signal line and the common line when the voltage between the signal line and the common line is equal to or higher than the reference voltage.

* * * * *